(12) United States Patent
Adams (10) Patent No.: US 11,111,439 B1
(45) Date of Patent: Sep. 7, 2021

(54) MICROWAVE APPARATUS FOR PYROLYZING CARBONACEOUS MATERIAL AND RELATED METHOD

(71) Applicant: Microwave Renewable Technologies, LLC, Mt. Gilead, OH (US)

(72) Inventor: Kevin A. Adams, Crestline, OH (US)

(73) Assignee: MICROWAVE RENEWABLE TECHNOLOGIES, Mount Gilead, OH (US)

( * ) Notice: Subject to any disclaimer, the term of this patent is extended or adjusted under 35 U.S.C. 154(b) by 0 days.

(21) Appl. No.: 15/860,581

(22) Filed: Jan. 2, 2018

(51) Int. Cl.
*C10B 19/00* (2006.01)
*C10B 7/06* (2006.01)
*C10B 53/07* (2006.01)
*C10G 1/10* (2006.01)
*C10B 49/04* (2006.01)

(52) U.S. Cl.
CPC .............. *C10B 19/00* (2013.01); *C10B 7/06* (2013.01); *C10B 49/04* (2013.01); *C10B 53/07* (2013.01); *C10G 1/10* (2013.01); *C10G 2300/1003* (2013.01)

(58) Field of Classification Search
CPC .......... C10B 7/06; C10B 19/00; C10B 49/04; C10B 53/07; C10G 1/10
See application file for complete search history.

(56) References Cited

U.S. PATENT DOCUMENTS

| | | | |
|---|---|---|---|
| 3,843,457 A | 10/1974 | Grannen | |
| 4,065,361 A | 12/1977 | Hanson | |
| 4,118,282 A | 10/1978 | Wallace | |
| 4,647,443 A * | 3/1987 | Apffel | ..................... C09C 1/482 201/2.5 |
| 4,740,270 A | 4/1988 | Roy | |
| 5,084,141 A * | 1/1992 | Holland | .................. C10B 53/07 201/19 |
| 5,167,772 A | 12/1992 | Parker, Sr. | |
| 5,366,595 A | 11/1994 | Padgett | |
| 5,507,927 A | 4/1996 | Emery | |
| 6,618,957 B2 | 9/2003 | Novak | |
| 7,101,464 B1 | 9/2006 | Pringle | |
| 7,607,860 B2 | 10/2009 | Novak | |
| 7,629,497 B2 | 12/2009 | Pringle | |
| 7,927,465 B2 | 4/2011 | Novak | |
| 8,268,133 B2 | 9/2012 | Novak | |
| 8,283,616 B2 | 10/2012 | Novak | |
| 8,382,957 B2 | 2/2013 | Fameman | |
| 8,562,793 B2 | 10/2013 | Novak | |
| 2002/0046474 A1 | 4/2002 | Novak | |
| 2007/0102279 A1* | 5/2007 | Novak | ................... A62D 3/178 204/157.6 |
| 2007/0131591 A1 | 6/2007 | Pringle | |
| 2008/0141589 A1* | 6/2008 | Farneman | .............. B01J 19/126 48/197 FM |
| 2008/0179177 A1 | 7/2008 | Cha | |

(Continued)

FOREIGN PATENT DOCUMENTS

WO    198904355 A1    5/1989

*Primary Examiner* — Renee Robinson (74) *Attorney, Agent, or Firm* — Daniel J. Schlue; Schlue IP Law (57) ABSTRACT

An apparatus and method for reducing an organic-containing material into lower molecular weight gaseous hydrocarbons, liquid hydrocarbons and solid carbon constituents utilizing microwave radiation.

6 Claims, 5 Drawing Sheets

(56) References Cited

U.S. PATENT DOCUMENTS

| | | |
|---|---|---|
| 2011/0132902 A1 | 6/2011 | Novak |
| 2013/0120085 A1* | 5/2013 | Harris .................... H01P 1/165 |
| | | 333/21 A |
| 2017/0349836 A1* | 12/2017 | Duncan .................. C10B 53/07 |

* cited by examiner

MICROWAVE APPARATUS FOR PYROLYZING CARBONACEOUS MATERIAL AND RELATED METHOD

RELATED U.S. APPLICATIONS

This application is based upon and claims the priority filing date of the previously filed, U.S. Provisional patent application entitled "MICROWAVE APPARATUS FOR PYROLYZING CARBONACEOUS MATERIAL AND RELATED METHOD" filed Dec. 30, 2016, Ser. No. 62/440,994, the entire disclosure of which is hereby incorporated herein by reference.

FIELD OF THE INVENTION

The present invention pertains to a pyrolysis process for depolymerizing tire material, particularly the utilization of microwaves in order to generate heat; and a mobile unit developed to make the process site transportable.

BACKGROUND

By way of background, the accumulation of large quantities of scrap tires has become a major environmental problem. Because of their resistance to biodegradation, used automobile tires provide a favorable environment for vermin, rodents, and fire. Environmental regulations, on the other hand, prohibit the disposal of such waste materials by burning outdoors or by burial underground.

The problem of waste tires accumulating has grown dramatically and now presents a significant environmental concern. Waste tires occupy a great deal of space in garbage dumps and landfills and constitute a contributing factor to a huge increase in generated waste that is causing the swelling of landfills.

The proliferation of waste tires generated annually has given rise to a search for an efficient and clean method to reduce the volume of waste tires. One method investigated extensively is heating the tires sufficiently to break them down into solid and fluid components, a process known as pyrolysis. Pyrolysis is the application of heat in chemical compounds in the absence of oxygen in order to cause decomposition. It involves a simultaneous change of chemical composition and physical phase and is irreversible. However, the pyrolysis process has its drawbacks such as low efficiencies, fouled heat transfer surfaces and low carbon quality products.

The benefits of pyrolysis are realized two-fold. First, many of the solid and fluid components can be recovered after pyrolysis and recycled to produce useful products. Secondly, the volume of waste products resulting after pyrolysis that are not recyclable is much less than that of the original waste tires. This helps slow the swelling of landfills.

In many instances, however, pyrolysis of waste tires is not feasible because of excessive energy costs incumbent in raising the tires to a high temperature. These energy costs are generally greater than any benefit accruing from reducing the flow of waste products to a landfill or revenue produced from the pyrolysis products. In addition, there are high costs associated with the disposal of toxins produced during pyrolysis, further frustrating utilization of this method for reducing the volume of waste tires.

An attempted solution to the problem of high excessive energy costs is to pulverize the tires into small pieces to (1) fit more efficiently into a heating chamber and (2) increase the surface area exposed to the heat. This procedure is particularly utilized with standard convection heating pyrolysis apparatus wherein the heat is transferred to the tires from the outside surface inward.

More recent innovations in the pyrolysis of waste tires have resulted in faster and more efficient heating and break down into solid and fluid components. Specifically, microwave energy is applied to heat the waste material as opposed to convection heating. Microwave energy is applied uniformly throughout the tire materials to heat them more uniformly and rapidly than with convection heating. In particular, microwaves are utilized to heat the material directly at the molecular level without any heat transfer at the material surface. The heat is generated from the rotating and vibrating of the molecules as a result of the molecules trying to align with the changing electromagnetic energy. The energy is so intense that the chemical bonds break and the original rubber is depolymerized directly into synthetic natural gas, a liquid fuel and carbon black.

Another disadvantage of prior art pyrolysis apparatus is that they are permanently constructed on a particular site, so waste material must be transported to that site for processing. In instances where waste tires are found in numerous landfills extending over wide areas, the cost of collecting and transporting the waste tires to the site of the pyrolysis apparatus is prohibitive.

The present invention provides an apparatus for reducing these problems. The difficulties inherent in the art are therefore overcome in a way which is simple, user-friendly, and efficient—which will provide better and more advantageous results.

SUMMARY

In a version of the invention, the system generally comprises an apparatus for reducing an organic-containing material into lower molecular weight gaseous hydrocarbons, liquid hydrocarbons and solid carbon constituents utilizing microwave radiation which comprises: (a) at least one microwave generator; (b) at least one sealed and purged microwave applicator, said microwave applicator purged with a non-flammable blanketing purge gas in proximity to a material to be reduced and in communication with said microwave generator via a pair of waveguides, said at least one microwave applicator containing said purge gas in a pressurized state above local atmospheric pressure to insure that no air migrates into said microwave applicator which might cause a fire or explosion hazard; (c) said applicator having a waveguide assembly for distributing microwave energy from the microwave generator to the applicator, the waveguide assembly having at least one or more waveguide inlets to the applicator, (d) each of said waveguide inlets having a pressurized dual quartz window assembly recessed at an operable distance from the microwave applicator; (e) a conveyor belt to transport said organic-containing material through said at least one applicator; (f) a purge gas generating means to provide a purge gas to said microwave applicator during an initial purge cycle and over the organic material under reduction during operation, said purge gas generating additionally providing said purge gas to said pressurized dual quartz window assembly and to a purge assembly system; (g) said purge assembly system comprising: (i) an infeed purge assembly; and (ii) an outfeed purge assembly; said infeed and outfeed purge assemblies purged by said purge gas from said purge gas generating means; (h) a microwave energy absorber to absorb any reflected microwaves; (i) a magnetron cooling means to maintain the magnetron within a specified operating temperature range;

(j) a process gas cooling means to separate condensable and non-condensable hydrocarbon vapors; (k) a scrubber; and (l) a gas turbine operatively coupled to an electrical generator to use said non-condensable hydrocarbon vapors to provide electricity to at least an external electrical grid.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense, but is made merely for the purpose illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Figure 1:
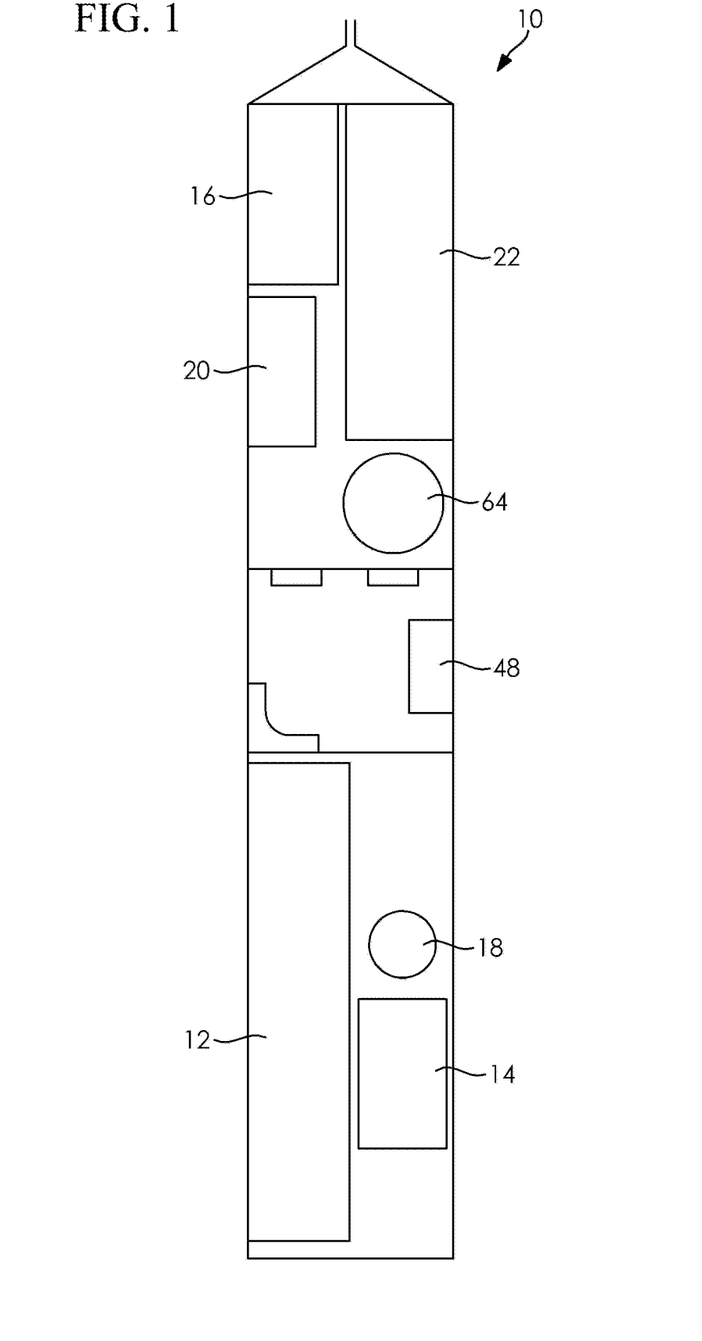
FIG. 1 is a top plan view of a microwave-based reduction system assembly illustrating an exemplary mobile version comprising an applicator, microwave generator, and an electric generator.
Figure 2:
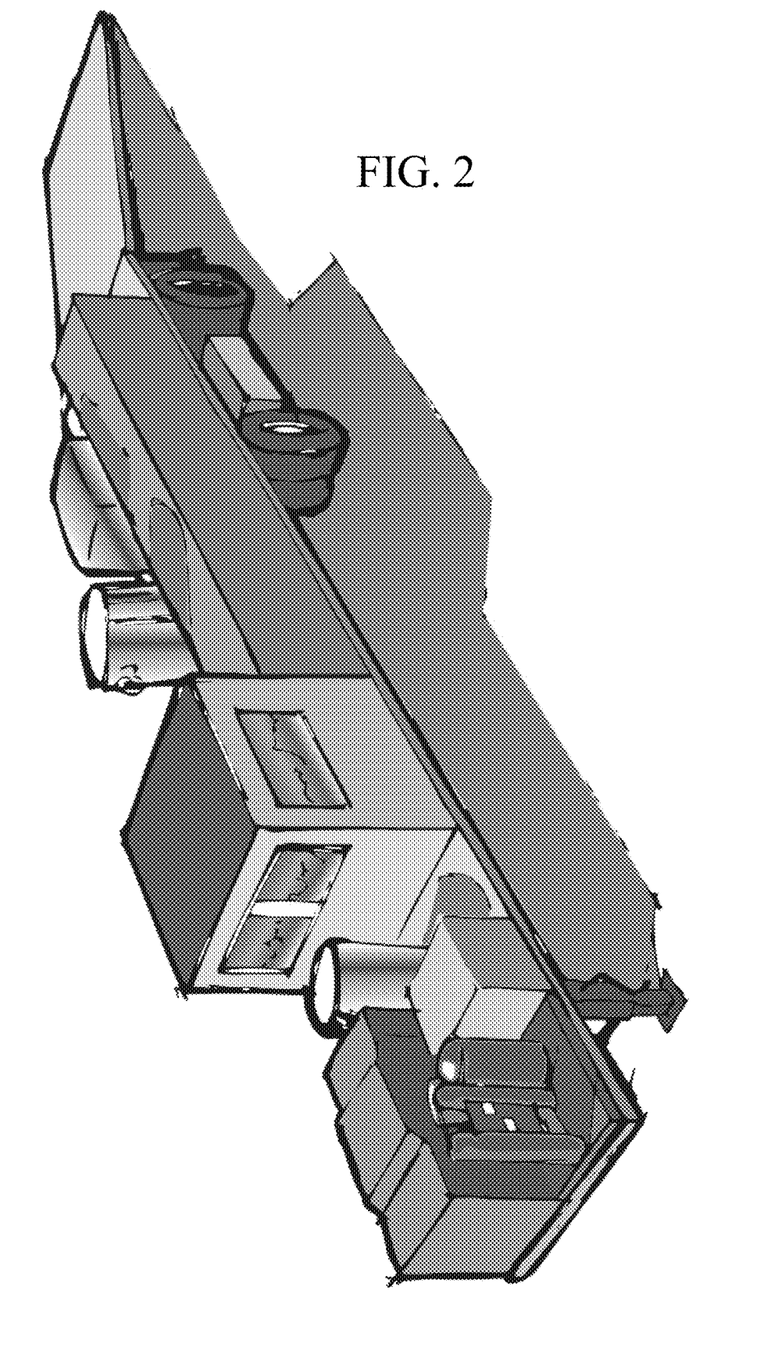
FIG. 2 is an illustrative perspective view of the mobile version shown in FIG. 1.

Attention is directed initially to FIG. 1 of the drawings, wherein a footprint illustration of the overall mobile configuration of a mobile microwave-based reduction system assembly 10 is shown. The mobile microwave-based reduction system 10 primarily focuses on process and efficiency improvements from what is taught in the prior art. The microwave technology disclosed herein has an 80% plus energy conversion, which directly heats the material eliminating heat transfer issues and a carbon product that has a low VOC (Volatile Organic Compound) or oil content—making it suitable for re-use applications.

The reduction system 10 can be configured to adapt to a small layout due to the reduced size and nature of the chosen configuration and equipment. The system can be transported from site to site on a standard sized tractor trailer. The system is completely self-contained and generally powered by the by-products produced during the microwave reduction process.

Overall, referring to FIG. 1-FIG. 8, the reduction system 10 comprises a microwave reduction applicator 12 which is operably coupled to a microwave generator 14. A nitrogen generator 16 is provided which displaces any air within the microwave reduction applicator 12 and provides a non-flammable blanketing over the organic material under reduction, in this case, scrap tire material. Further a gas processor condenser 18 is provided, which receives the hydrocarbon vapor stream from the output of microwave applicator 12 and a refrigerated chiller 20, which provides continuous cooling water to the magnetrons and control cabinets for heat rejection. In the version, an electrical generator 22 is provided, which is sized to provide all electrical energy to the microwave system and ancillary equipment.

Figure 8:
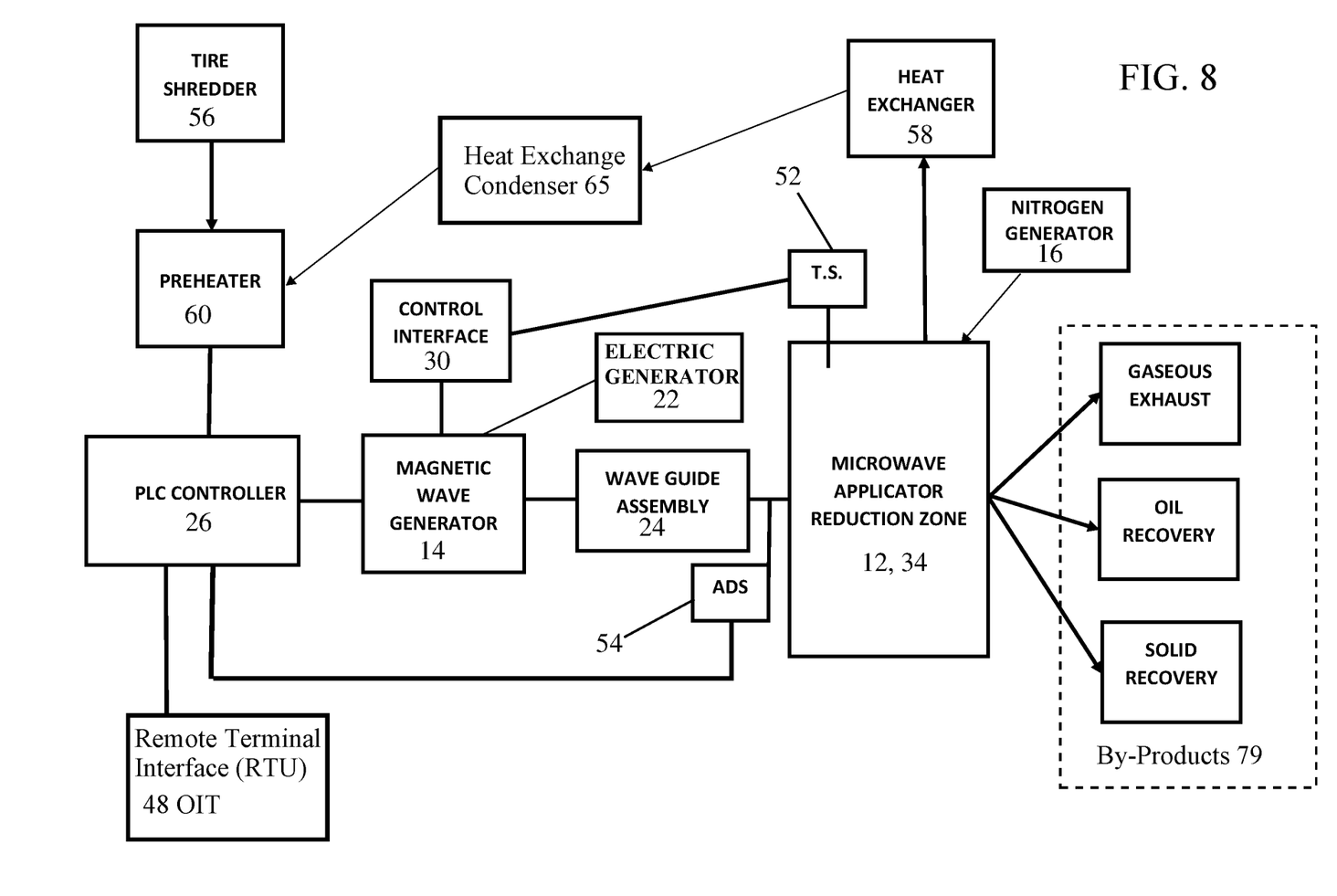
FIG. 8 is a block diagram of an exemplary version of the microwave apparatus.

In the version, the mobile microwave generator 14 is in continuous electronic communication with and controlled by a Programmable Logic Controller known as a PLC 26 (See FIG. 8). Ideally, the microwave generator 14 has one magnetron and a microwave circulator with water load. The generated microwaves are operably directed from the microwave generator 14 to the microwave reduction applicator 12 via a series of one or more rectangular waveguides assemblies 24.

The source of the microwave energy is the magnetron, which operates at frequencies, which range from 894 MHz to 2450 MHz, preferably 915 MHz and has a rating of 100 kW. The power and frequency are more than suitable to heat the organic material to the reduction temperature of 680 degrees. The lower frequencies are preferred over the more common frequency of 2,450 MHz typically used in conventional microwave ovens due to increased individual magnetron power and penetration depth into the organic material, along with an increase in operating efficiency from 40% in the case of 2450 MHz magnetrons, to in excess of 88% for 915 MHz magnetrons. Moreover, the 915 MHz magnetrons are smaller which reduces the overall footprint of the reduction system 10. The magnetron has a microwave generator control interface 30 in electronic communication with PLC control system 26.

Figure 3:
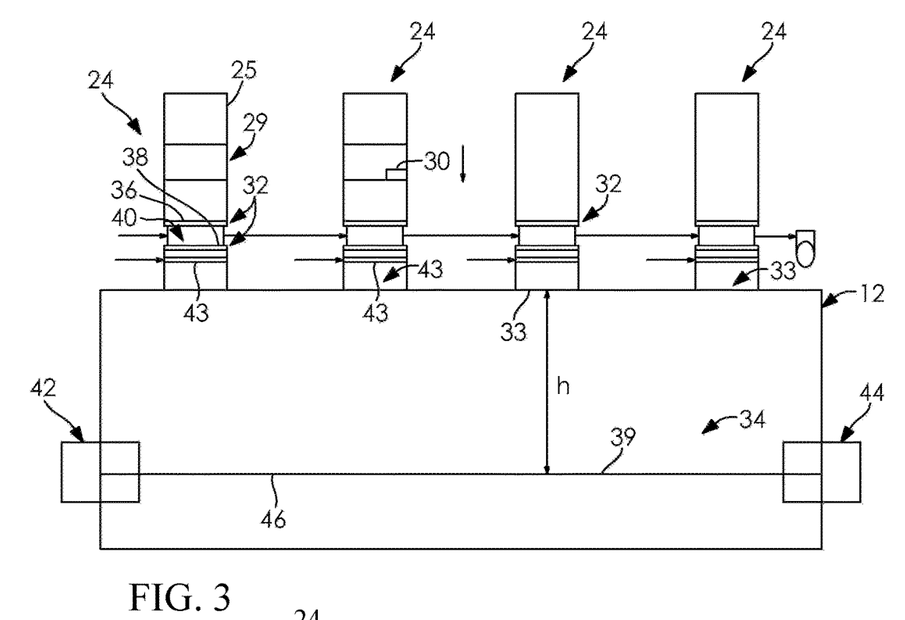
FIG. 3 is a block diagram of an exemplary version of the electromagnetic waveguide and applicator system.
Figure 4:
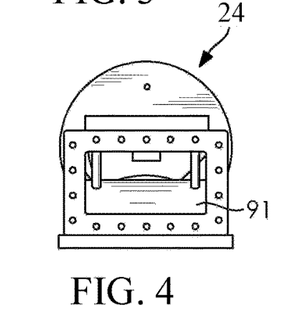
FIG. 4 is front elevation view of an exemplary version of a waveguide.
Figure 5:
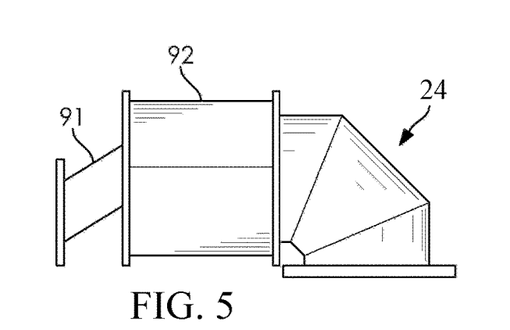
FIG. 5 is a side elevation view of the waveguide shown in FIG. 4.
Figure 6:
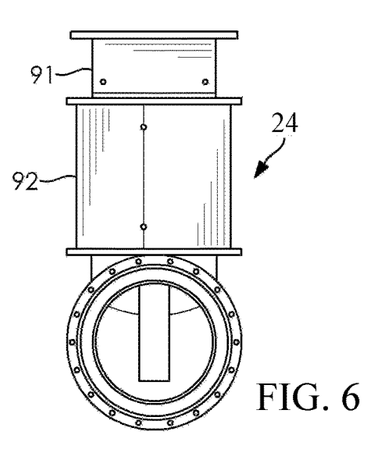
FIG. 6 is a bottom plan view of the waveguide shown in FIG. 4.
Figure 7:
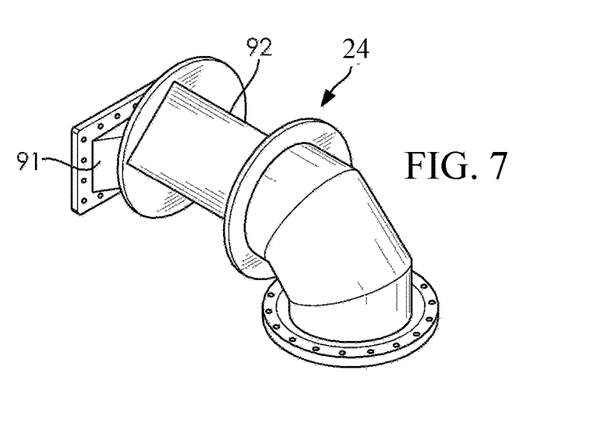
FIG. 7 is a perspective view of the waveguide shown in FIG. 4.

As best illustrated in FIG. 3, the illustrated version has a total of four waveguide assemblies 24 each having a waveguide inlets 33 to the microwave applicator 34. The number of waveguide assemblies 24 or feed assemblies utilized can vary depending on the specific application and the microwave power required for the application. Each waveguide assembly 24 comprises a microwave polarizer 29 and preferably a tuner 30 for providing optimal energy levels during processing. The polarizer 29 and the tuner 30 are located between the waveguide 25 and the microwave reduction applicator 12.

Preferably, and referring to FIG. 4-FIG. 7, a polarizer 29 and tuner 30 operably configured to reflect one or more of the attributes taught by published U.S. application 2013/0120085 and U.S. Pat. No. 9,054,405, which are incorporated herein by reference in their entirety, are utilized within the waveguide assembly 24. FIG. 4-FIG. 7 illustrate a version of the waveguide assembly 24 having a polarized configuration which is configured to evenly disperse microwaves into the microwave applicator 34. The microwaves are dispersed in a manner that the carbon material in the microwave applicator 34 does not need to be turned or the polarizer itself in order to accomplish even and uniform heating of the target material. The example waveguide 24 and polarizer of FIG. 8A-8D includes a first rectangular section 91 adjacent to the microwave source, and a second rectangular section 92 which is sized to separate, disperse and randomized microwaves received from the first waveguide rectangular section 91.

Testing and analysis of the waveguide assembly 24 (FIG. 4-FIG. 7) in conjunction with the applicator 12 (FIG. 3) was conducted showing favorable results. The testing involved varying depths of reduced organic material and the distance between the floor 39 of the applicator to the waveguide inlet 33 having variable distance h (See FIG. 3). The test concluded that the ideal height L of the reduced organic material for providing the highest efficiency regarding energy transfer is between 1-3 inches. Further the testing concluded that the ideal distance h between the floor 39 of the applicator 12 to the waveguide inlet 33 is approximately between 7-11 inches.

In other versions, the polarizer 29 is rotated during operation—which manipulates the microwave energy passing from the waveguide 24 to the reduction applicator 12 by rotating the waves or splitting the microwaves into multiple phases, thereby spreading the microwave energy more evenly. Preferably, a three-stub tuner 30 is utilized for matching load impedances to provide a maximum power transfer between the generator 14 and organic material—reducing reflection of the microwaves or wasted energy. The combination of the rotational polarizer 29 and the three-stub tuner 30 provide superior, more efficient results by reducing the amount of reflected microwaves.

In the event that the microwave energy is not absorbed by the organic material, a condition, which results in reflected microwave energy, this energy is redirected by a device known as a circulator and subsequently absorbed by a water load. The circulator is sized to absorb 100% of the microwave energy generated by the magnetron.

Each magnetron transmits its energy via the waveguide 24 through a dual quartz pressure window assembly 32 which is microwave transparent and is configured with the microwave reduction applicator 12. The dual quartz window assembly 32 generally operates to contain the pressure within the microwave applicator 34 and prevent any potentially hazardous gas from entering the waveguide 24 back to the microwave generator 14. In the example version illustrated by FIG. 3, a total of four waveguides 24 are utilized positioned in series at the top of the microwave applicator 12 above the operational path of the organic material being processed. In a version of the invention, the waveguides 24 positioned in series are configured to each provide less microwave power to the carbonaceous material moving downstream.

It is well known that throughout the life of traditional quartz windows, the surface of the glass may accumulate contamination over time which can cause hot spots and ultimately crack the window. In order to prevent this situation, the invention as best illustrated by FIG. 3, provides a dual quartz window design. In the version, the dual quartz window assembly 32 comprises a first quartz window 36 positioned upstream of a second quartz window 38 defining a sealed space 40 therebetween. The first and second quartz window 36, 38 surfaces are positioned tangential to the microwave energy flow through the waveguide 24. The second quartz window 38 positioned downstream approximately 12 inches from the first quartz window. The space 40 is purged with nitrogen by the nitrogen generator 16 in order to keep condensable hydrocarbons from forming on the window and to provide safety in the event of a window fracture or failure.

The second quartz window 38 is recessed approximately twelve (12) inches within the waveguide 24 from the microwave reduction applicator 12 providing a space 43 therebetween. The space 43 is purged with N2 in order to form an improved protective barrier which prevents heat and gaseous product produced within the microwave applicator 12 from contaminating the waveguide 24 and quartz windows, 36, 38 otherwise maintaining a cleaner waveguide 24. Nitrogen is purged into the space 43 by an air knife manifold or other means known in the art.

The microwave reduction applicator 12 has a microwave reduction chamber 34. Moreover, the microwave reduction applicator 12 has one infeed port 42 and one outfeed port 44, which are in longitudinal communication with a continuous stainless steel conveyor belt 46. The conveyor belt 46 transverses through the microwave reduction chamber 34 connecting the infeed port 42 and the outfeed port 44. Ideally, the conveyor belt 46 is configured to accommodate 4 inches or less of tire material. The conveyor belt 46 width is ideally approximately 30 inches; however, can range from 24-48 inches.

During operation, the microwave reduction chamber 34 is purged with nitrogen gas by the nitrogen generator 16 to displace any air within, and is maintained in a slightly pressurized state above local atmospheric pressure. This ensures that no air migrates into the microwave reduction chamber 34 during opening of either the infeed port 42 or outfeed port 44. The infeed and outfeed systems may be configured as a gated airlock or nitrogen purged rotary valve. Since the microwave reduction applicator 12 is slightly pressurized, nitrogen will flow toward infeed port 42 and the outfeed port 44, instead of air flowing into the microwave reduction chamber.

The internal walls of the microwave reduction applicator 12 are made from either low-loss 6061-t6 aluminum plate or Type 316 stainless steel, depending upon the application. High temperature applications in excess of 900° F. (482° C.) and corrosive atmospheres require the use of Type 316 stainless steel. Microwave reduction of scrap tires results in an equilibrium temperature occurring at 680° F. (360° C.) in a relatively non-corrosive atmosphere, therefore, the aluminum plate is the material of choice.

Sequencing of the infeed system, conveyor belt 46 speed control, outfeed system, magnetrons and nitrogen purge gas system is under PLC 26 program control at all times. The PLC 26 provides metering, sequencing and control of the microwave generator 14, conveyor motors and applicator 12 controls.

Microwave system control is accomplished by the use of a Programmable Logic Controller (PLC) 26 with Digital and Analog Input/Output (I/O) Modules and a link to a Remote Terminal Unit (RTU) 48, which are all mounted in the Main Control Panel (MCP). The RTU 48 is also known as an Operator Interface Terminal (OIT). A PLC communications modules/microwave generator control interface 30 is mounted in the microwave generator 14 enclosure, which permits continuous bidirectional communication between the PLC 26 and the OIT 48. The PLC 26 program provides continuous sequencing, monitoring and control functions in real time. The PLC 26 program also communicates along a data highway to display alarm/shutdown status and operating parameters. The OIT 48 provides multiple displays in both digital and analog formats in real time. The OIT 48 indicates power output, reflected power, anode current, anode voltage, filament current, electromagnet current, generator cabinet temperatures, applicator temperatures and pressures, internal and external water temperatures, hydrocarbon vapor flow rates, process operating curves, PID control loop status, and parametric data from the nitrogen generator 16, chiller 20, process condenser 18, and scrubber, all in real time.

Additional magnetron protection is ensured by monitors which detect forward and reflected power, and de-energizes the high voltage to the magnetron in the event of high threshold levels of reflected power. Moreover, the temperature of the reduction applicator can be determined by a temperature sensor 52. Ideally, the temperature sensor 52 is provided by an infrared pyrometer which is connected to the PLC 26 by a fiber optic cable. The face of the pyrometer 52 is preferably purged with nitrogen by the nitrogen generator 16 in order to prevent contamination of the reduction applicator.

An arc detection system 54 (FIG. 8) further protects the magnetron and waveguide 24 by de-energizing the high voltage upon detection of arcing within the microwave reduction applicator 12. Ideally, the arc detection system 54 includes an arc detector at each waveguide 24 inlet to the reduction applicator 12 viewing downward above the material in order to detect when a spark forms within the applicator 12. Arcs can form when the concentration of energy is too great and begins to conduct. Moreover, a plasma spark can only be extinguished by terminating the power to the microwave generator 14. An arc detection system 54 can be any type of vision sensor which detects light in the form of a spark which sends a signal to the safety shutdown system or PLC 26 to terminate power immediately. Example arc detection systems 54 may include infrared (IR) sensors, smoke detection and rate-of-rise temperature detectors plus combustible gas detectors adjacent to the applicator, which are all wired in series with the safety shutdown system.

As desired, any shutdown parameter, which exceeds its preset limit, initiates an immediate shutdown of the high voltage system, and enables the safety shutdown system to proceed through an orderly and controlled shutdown. The safety shutdown system includes both fail-safe hardwired circuitry and PLC 26 shutdown logic, along with local and remote emergency stop buttons to ensure maximum protection for operating and maintenance personnel and equipment.

The invention may also comprise elements which are utilized in order to prepare the organic material for reduction. These elements may include a tire shredder 56 for pulverizing tires into small shreds and a heat exchanger 58 which preheats and preconditions the tire shreds to a consistent moisture level which allows more even heating and reduction during the microwave reduction process.

In the illustrated version, the tire shredder 56 may comprise a plurality of varying sized shredders with a first primary shredder configured to reduce the tire into approximately 2-inch shreds and a secondary shredder configured to further reduce the tire shreds to approximately ¾ inch. The ¾ inch size is desirable because it can be evenly loaded onto the conveyor belt; however, other sizes can certainly be envisioned.

Another optional phase of the system is to recycle the heat from the hot gases generated in the pyrolysis heating chamber into a preheat section. Tire material passes through the preheat section prior to the pyrolysis section and is preheated therein so that less heating, and less energy is required in the pyrolysis section. The consistency of the quality of the tire shreds is critical to the efficiency of the microwave reduction process. Tire shreds inherently have considerable surface area and most often are stored outdoors subjected to the outside elements. The preheat process is carried out by a heat exchanger 58 including a preheater 60 and tunnel which utilizes a heated oil to convey the heat. The preheater 60 conditions the tire material by the application of heat which dries the tire material to a consistent moisture level before the microwave production process. Water generally requires a significant amount of energy to evaporate during the microwave reduction process. The application of heat reduces the water vapor on the surface of the tire shreds which also improves the quality of the resulting Syngas and liquid by-products after the microwave reduction process. In the illustrated version, the heat exchanger 58 operates by transferring heat from the byproducts of the microwave reduction process, such as the resulting carbon via the heat exchange tunnel to the preheater 60, which applies heat to the tire shreds. The heat exchanger 58 tunnel transfers the heat by a heat transfer oil. It will be noted that the exiting carbon from the microwave reduction process contains approximately 102,000 btu per hour. Approximately 80% of the exiting heat can be utilized and transferred to the tire shreds awaiting microwave reduction processing.

A heat exchange condenser 65 is coupled with the heat exchanger 58 and the preheater 60 and is utilized to remove and collect the condensed water vapor during the tire shred heating process.

The microwave reduction system 10 may also further comprise elements which further process the resulting by-products 79 of the microwave reduction process. Primarily, the products of the microwave reduction process of the tire material include carbon, syngas, and oil. The products consist of 50% gas (carbon and syngas) and 50% oil. These ratios may vary depending on temperature and pressure during the microwave reduction process. If more gas is desired, the operating temperature can be increased. Operating ranges generally fall between 680 degrees-800 degrees. Typically, after the microwave reduction processing of a 20 lb passenger tire, approximately 10 lbs of carbon, 5 lbs of Syngas, and 5 lbs of oil result. Moreover, excess carbon can be conveyed to a container and later sold to a third party.

The resulting gaseous product produced during the microwave reduction process can be condensed utilizing a water-cooled gas processor condenser 18. Moreover, a refrigerated chiller 20 can be utilized to further reduce the temperature of the materials entering the condenser 18. As an example, a thermal absorption chiller may be utilized which utilizes the heated oil from the heat exchanger 58 in order to drive the chiller 20. The thermal absorption chiller can also be operated by heated antifreeze generated by the electric generator 22.

A gas scrubber may also be utilized to process the exiting carbon gas.

The resulting oil from the process can be conveyed and stored in containers suited for the containment of oil.

In a version of the invention, power for the mobile version of the microwave reduction system is provided by an onboard diesel-electric generator 22, and the ancillary items, including the nitrogen generator system 16, scrubber system 64, and chiller system 20. All pertinent electrical parameters regarding the diesel generator 22 operation are displayed on a continuously updated output module, located on the front of the generator control panel. Moreover, the electrical generator 22 can be initially started by diesel and then powered by the syngas produced by the microwave reduction process.

Figure 9:
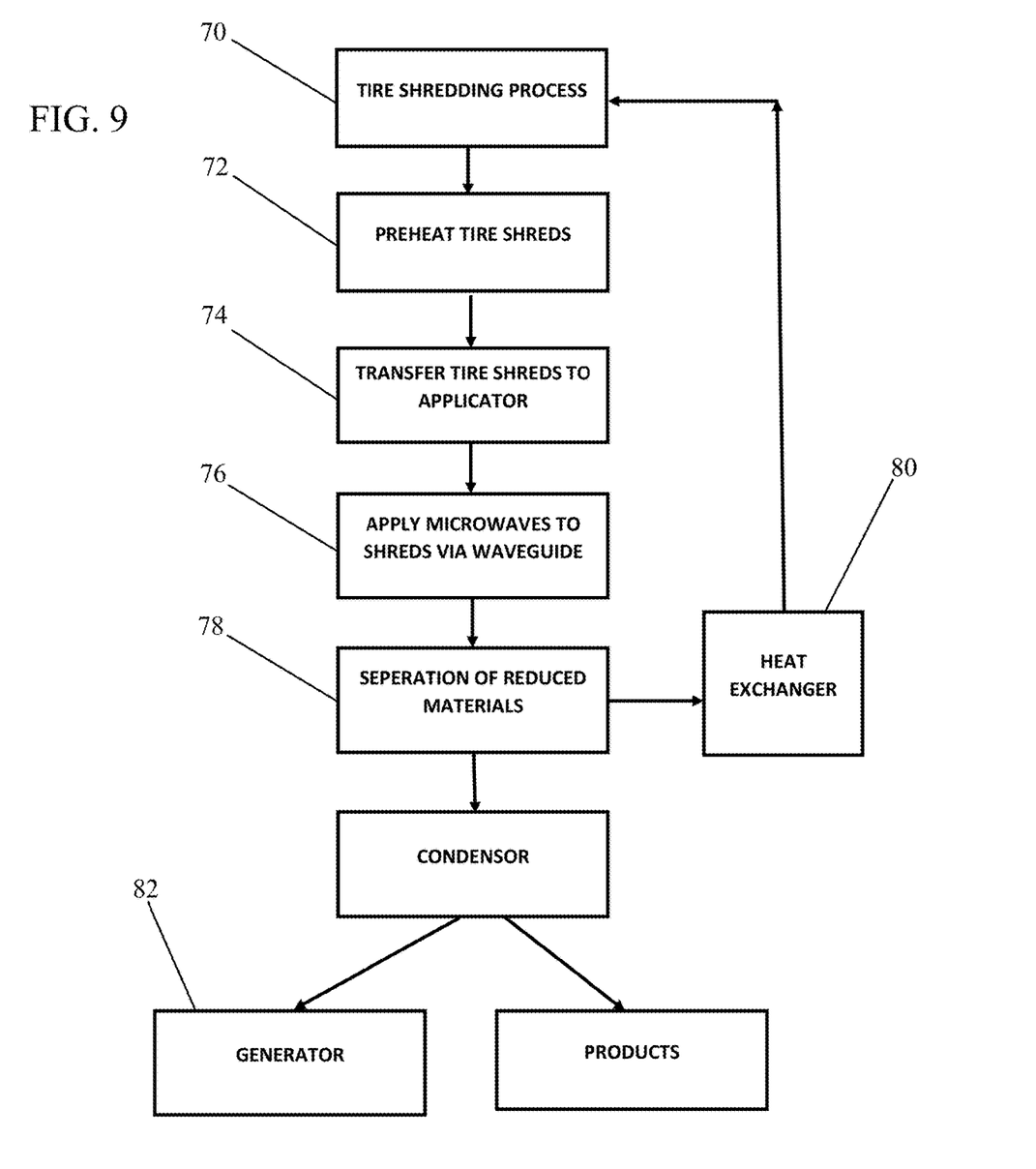
FIG. 9 is a flowchart of an exemplary version of a process for pyrolyzing carbonaceous material.

The overall process of utilizing the above-described elements will now be described in more detail. Referring to FIG. 9, the general process comprises shredding the tire material 70, preheating the shredded tire material 72, transferring the tire shreds to the applicator 74, reducing the tire shred materials by the application of microwaves 76, separating and processing of the reduced organic material 78, transferring heat via the heat exchanger to the shredded tire material prior to reduction 80, and providing syngas product to the electrical generator 82.

In a detailed version of the invention, the process for reducing organic-containing material into lower molecular weight gaseous hydrocarbons, liquid hydrocarbons and solid carbon constituents utilizing microwave radiation comprise the steps of: (a) feeding a sample of organic-material into an infeed system, wherein the infeed system contains a non-flammable blanketing purge gas; (b) transferring the material into at least one microwave applicator 12 containing the purge gas in a pressurized state; (c) exposing the material in the microwave applicator 12 to microwaves from a waveguide 24 for a period of time sufficient to volumetrically reduce the material into the constituents, a frequency of the microwaves at approximately 915 MHz; (d) transporting the purge gas to pressurized quartz window assembly 32 at an end of each waveguide 24 leading into the at least one microwave applicator 12; (e) monitoring the thermal temperature of the microwave applicator 12 by a temperature sensor 52; (f) collecting gaseous byproduct constituents from the volumetrically reduced sample in the microwave applicator 12; (g) purging an outfeed system for the organic-containing material with the non-flammable blanketing purge gas; (h) removing the volumetrically reduced organic-containing material from the transporting means after passage from the outfeed system; (i) cooling the collected gaseous byproduct constituents for a sufficient time to allow condensables in the gaseous byproduct constituents to form a liquid; and (j) feeding the collected gaseous byproduct constituents into a gas turbine coupled to an electrical generator 22 to provide electricity to the system 10.

The invention does not require that all the advantageous features and all the advantages need to be incorporated into every version of the invention.

Although preferred versions of the invention have been described in considerable detail, other versions of the invention are possible.

All the features disclosed in this specification (including accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. An apparatus comprising:
    a microwave generator that generates microwave energy at 915 MHz and having a rating of 100 kW;
    a microwave reduction applicator having a microwave reduction chamber;
    the microwave reduction chamber having a volume;
    an inert gas generator assembly configured to saturate the microwave-reduction-chamber volume with an inert gas by introducing the inert gas into the chamber under a pressure that is above local atmospheric pressure;
    the microwave reduction applicator having a ceiling;
    the microwave reduction applicator having an infeed port and an outfeed port;
    the microwave reduction applicator configured to receive and process organic-containing material having a depth between about 1 inch and about 3 inches;
    a conveyor belt assembly configured to continuously transport organic-containing material into the chamber via the infeed port, through the chamber, and out of the chamber via the outfeed port;
    the conveyor belt assembly having a conveyor belt;
    a height defined as the shortest distance between the conveyor belt and the ceiling, wherein the height ranges from approximately 7 inches to approximately 11 inches;
    a waveguide assembly operatively communicating with the microwave generator and the microwave reduction applicator, the waveguide assembly configured to distribute microwave energy from the microwave generator to the microwave reduction applicator, the waveguide assembly further configured to emit polarized microwaves into the microwave reduction chamber; and
    a dual quartz window assembly having a first quartz window and a second quartz window forming a sealed space therebetween, the dual quartz window assembly recessed an operable distance from the microwave applicator and upstream of the waveguide inlet, wherein the second quartz window is positioned downstream at least approximately 12 inches from the first quartz window, and
    wherein the second quartz window is recessed approximately at least 12 inches within the waveguide assembly from the microwave reduction applicator.

2. The apparatus of claim 1, wherein the waveguide assembly comprises a first section having a rectangular cross-sectional area, the first section adjacent to both the microwave generator and a second section having a rectangular cross-sectional area, the second section downstream of the first section, the second section operably sized and configured to separate, disperse, and randomize microwaves received from the first section.

3. The apparatus of claim 2, further comprising a tubular third section that is downstream of the second section, and wherein the tubular third section operably communicates with the microwave reduction applicator.

4. The apparatus of claim 1, wherein the conveyor belt is stainless steel.

5. The apparatus of claim 1, wherein the waveguide assembly operably communicates with the microwave reduction applicator through the ceiling of the microwave reduction applicator.

6. An apparatus comprising:
    a microwave generator that generates microwave energy at 915 MHz and having a rating of 100 kW;
    a microwave reduction applicator having a microwave reduction chamber;
    the microwave reduction chamber having a volume;
    an inert gas generator assembly configured to saturate the microwave-reduction-chamber volume with an inert gas by introducing the inert gas into the chamber under a pressure that is above local atmospheric pressure;

the microwave reduction applicator having a ceiling;

the microwave reduction applicator having an infeed port and an outfeed port;

the microwave reduction applicator configured to receive and process organic-containing material having a depth between about 1 inch and about 3 inches a conveyor belt assembly configured to continuously transport organic-containing material into the chamber via the infeed port, through the chamber, and out of the chamber via an outfeed port;

the conveyor belt assembly having a stainless steel conveyor belt;

a height defined by the shortest distance between the conveyor belt and the ceiling, wherein the height ranges from approximately 7 inches to approximately 11 inches;

a waveguide assembly operatively communicating with the microwave generator and the microwave reduction applicator, the waveguide assembly configured to distribute microwave energy from the microwave generator to the microwave reduction applicator, the waveguide assembly further configured to emit polarized microwaves into the microwave reduction chamber;

wherein the waveguide assembly comprises a first section having a rectangular cross-sectional area, the first section adjacent to both the microwave generator and a second section having a rectangular cross-sectional area, the second section downstream of the first section, the second section operably sized and configured to separate, disperse, and randomize microwaves received from the first section, a tubular third section that is downstream of the second section, wherein the tubular third section operably communicates with the microwave reduction applicator;

the waveguide assembly having a three-stub tuner for matching load impedances to provide maximum power transfer between the generator and the organic-containing material;

a dual quartz window assembly having a first quartz window and a second quartz window forming a sealed space therebetween, the dual quartz window assembly recessed an operable distance from the microwave applicator and upstream of the waveguide inlet, wherein the second quartz window is positioned downstream at least approximately 12 inches from the first quartz window, and wherein the second quartz window is recessed approximately at least 12 inches within the waveguide assembly from the microwave reduction applicator;

a gas processor condenser operatively adapted for receiving and condensing gaseous product emitted from the microwave reduction applicator;

a scrubber operatively adapted for receiving and processing gaseous product emitted from the gas processor condenser; and a gas turbine operably coupled to an electrical generator and adapted for receiving gaseous product emitted from the scrubber.

\* \* \* \* \*